United States Patent

[11] 3,551,716

| [72] | Inventors | Knut Jensen;<br>Gerhard Schwarze, Joachim Witting, Karl-Marx-Stadt, Germany |
|---|---|---|
| [21] | Appl. No. | 858,410 |
| [22] | Filed | Sept. 16, 1969 |
| [45] | Patented | Dec. 29, 1970 |
| [73] | Assignee | Zentrallaboratorium Elektrogerate der VVB Elektrogerate Karl-Marx-Stadt, Germany |

[54] ELECTRIC CONTACTS FOR COLLECTOR LAMELLAE
11 Claims, 6 Drawing Figs.

[52] U.S. Cl. .................................................. 310/234
[51] Int. Cl. .................................................. H02k 13/00
[50] Field of Search .......................................... 310/231,
233, 234, 235, 237, 270, 219, 224, 236, 231, 247, 242

[56] References Cited
UNITED STATES PATENTS

| 3,244,917 | 4/1966 | Gute .............................. | 310/237 |
| 3,473,062 | 10/1969 | Forste et al. .................. | 310/234 |

*Primary Examiner*—Milton O. Hirshfield
*Assistant Examiner*—L. L. Smith
*Attorney*—Tab T. Thein ABSTRACT: Electric contacts between nonmetallic, such as carbon, collector lamellae and metallic armature windings of electric motors, comprising a resilient, electrically nonconductive carrier disc to be disposed on the rotor shaft of the motor between the lamellae and the armature, and a plurality of rigid, conductive pressure members secured to the disc in a symmetrical, radial arrangement, the number of the members corresponding to that of the lamellae, for providing proper electric contact between the ends of the windings and the lamellae.

PATENTED DEC 29 1970  3,551,716

INVENTORS
KNUT JENSEN
JOACHIM WITTING
GERHARD SCHWARZE

BY *Jab Shein*
AGENT

ELECTRIC CONTACTS FOR COLLECTOR LAMELLAE

The invention relates to electric contacts for collector lamellae or segments in collector rings of electric motors, the rings preferably being made of carbon. The lamellae are connected with the armature winding ends in an electrically conductive manner by way of a carrier disc. This expedient may be successfully applied in electric contacts between nonmetallic collector lamellae and metallic winding ends of electric motors.

It is known that for a connection between the lamellae and the winding ends of electric motors, rigid carrier discs of electrically nonconductive material can also be used. The discs are then seated between the collector rings and the winding heads upon the rotor shafts and, over the entire circumference thereof, corresponding to the number of lamellae or segments, they are provided with cutouts in which resilient metallic riders are disposed on the sides facing and in the direction toward the collector rings.

To give the riders appropriate support, it has been furthermore proposed to make the riders in an angular form so that they are anchored in the cutouts of the carrier disc and, if necessary, to lodge another simple, nonconductive disc on the side turned away from the collector ring, whereby all rider ends are pressed against the carrier disc This procedure has the drawback that the function and effectiveness of the contact and thus of the entire electric motor substantially depends on the mechanical tension, i.e., on the resilience of each individual spring action rider.

Another drawback results from any pretreatment which may have to be given to the riders in order to prevent natural fatigue phenomena of these metals, as well as when the resilient riders are fastened to the carrier disc in that the ends of the riders might be pressed against the disc by means of the additional, nonconductive disc which makes manufacture more expensive.

It is an object of the invention to eliminate the drawbacks adhering to the prior art while, at smaller financial outlays, stable electric contacts are attained.

According to one of the important characteristics of the invention this is achieved in that rigid current transmitting members in the shape of pressure members are secured on an eleatic, electrically nonconductive carrier disc and the collector ring is pressed against the disc The latter is preferably made of a thin, fiberglass-reinforced material so that, when the collector ring is pressed against the carrier disc deformation of the latter occurs which provides the required pressure for the current transmitting members.

The pressure members secured to the carrier disc may have the shape of rivets, sometimes with angular shanks, or the shape of hooks, whereas the sides of the members, facing the collector ring, may have any desired shape, for example, flat, concave, convex, conical, etc.

The carrier disc with the pressure members is seated in the known fashion on the rotor shaft between collector ring and armature winding, and it is secured against unwanted rotation by means of one or more drive pins. The collector ring is likewise secured against axial movement by means of a securing ring disposed on the rotor shaft or by means of a spline.

The elastic carrier disc which may be made of a fiberglass-reinforced molded or injection-molded plastic material or other substance having similar properties, has on its circumference cutouts to accommodate the pressure members in the shape of angular rivets or hooks, or rivets with straight shanks.

To increase the elasticity of the carrier disc it is preferably slit between the pressure members. The slits run radially from the outer circumference of the carrier disc in the direction toward a central bore, and they are, in a manner known per se, limited by bores at the ends closer to the central bore, which prevent breakage.

When an even number of pressure members is disposed on the carrier disc corresponding to an even number of collector lamellae or segments, the carrier disc is slit between consecutive pairs of pressure members, and when an uneven number of members is employed, the disc is preferably slit between all pressure members.

It is one of the main advantages of this invention that by means of the thus constructed carrier disc the electric contact between the lamellae and the pressure members no longer depends on the resilience of each individual member but on one factor only, namely the resilience of the elastic carrier disc itself.

The slit segments of the carrier disc with one or two current transmitting members on each segment in the shape of pressure members, provide for uniform and stable contact pressure by means of single- or two-point contact areas per segment. This makes possible an increasingly uniform and secure electrical contact at low cost while at the same time the collector body may be replaced at any time.

Other objects, features and many of the attendant advantages of the invention will be readily appreciated as the same becomes better understood by reference to the following detailed description, when considered with the accompanying drawing, wherein.

Three embodiments of a carrier disc according to the invention are described hereinafter, with reference to FIGS. 1 and 1A, FIG. 2 as well as FIGS. 3, 3A and 3B. The manner in which the electric contacts are provided for collector lamellae, by the aid of the illustrated carrier discs is shown only in FIG. 3B although, it will be understood, the latter applies to all three inventive embodiments.

On a thin, resilient, electrically nonconductive carrier disc 11, 21, 31 (as shown in the above enumerated respective FIGS. circumferential cutouts 12, 22, 32 are provided for securing therein several relatively rigid pressure members, such as 13, 23, 33, respectively. The number of the members corresponds to that of the commutator lamellae or segments 1 (see FIG. 3B), as will be explained somewhat later in more detail. The current transmitting pressure members are made of an electrically conductive material. The collector ring with the segments is preferably made of carbon while the carrier discs 11, 21, 31 may be made of a fiberglass-reinforced molded or injection-molded plastic material or other substance having similar properties.

Figure 1:
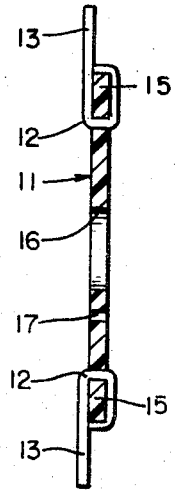
FIG. 1 shows a first exemplary embodiment of a carrier disc for providing the electric contacts for collector lamellae according to the invention, in a substantially vertical sectional view taken along line 1–1 of FIG. 1A.
Figure 1A:
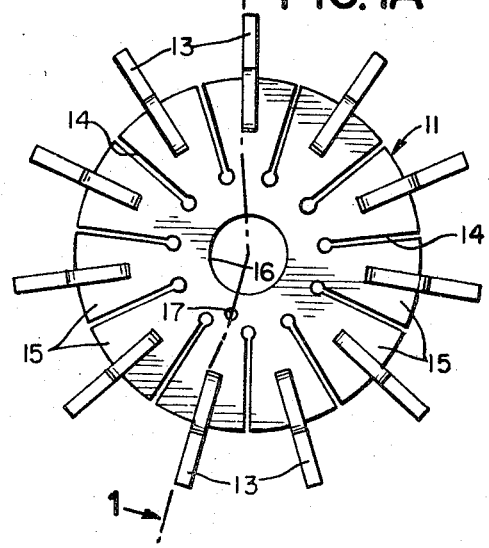
FIG. 1A is a front view of the first carrier disc of FIG. 1.
Figures 2, 3:
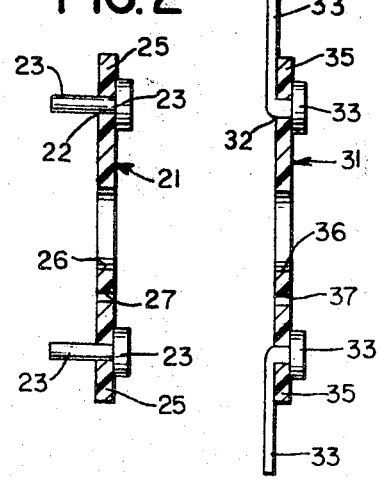
FIG. 2 is a sectional view similar to that of FIG. 1, of a second exemplary embodiment according to the invention.
FIG. 3 is another sectional view, of a third embodiment of an inventive carrier disc taken along line 3–3 of FIG. 3A.
Figure 3A:
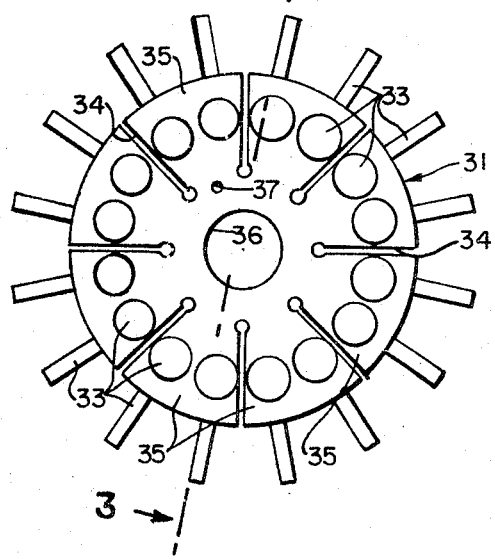
FIG. 3A is a front view of the third carrier disc of FIG. 3.
Figure 3B:
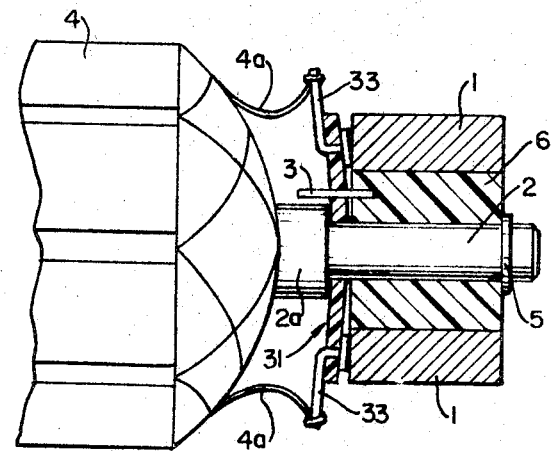
FIG. 3B is a partly sectional side of the third carrier disc in conjunction with the associated rotor shaft, armature winding and collector lamellae.

In FIGS. 1 and 1A the pressure members 13 of the first embodiment are hook shaped; in FIG. 2 the members 23 of the second embodiment have the shape of simple rivets; and finally in FIGS. 3, 3A and 3B the third embodiment is shown with members 33 in the form of rivets with angularly bent shanks. The sides of the members, facing the collector ring, may have any desired shape, for example, flat, concave, convex, conical, etc. For the sake of clarity substantially flat surfaces have been shown in all three embodiments.

The carrier discs 11, 21, 31 are provided with respective radial slits, such as shown in FIGS. 1A and 3A for two of the three embodiments at 14 and 34, respectively, thereby increasing their elasticity. The slits laterally limit segments 15, 35 (and also 25 as shown in FIG. 2) which carry one or two of the aforementioned pressure members 13, 23, 33. The disc 21 of FIG. 2, although not shown in a front view, may have a similar arrangement. The inner ends of the slits 14, 34 are preferably limited by bores or enlargements to prevent the slits to break out between the segments 15, 25, 35.

The discs have central bores 16, 26, 36 adapted to the diameter of the rotor shaft 2 to which the discs are to be fitted (see FIG. 3B); the discs are preferably provided with bores 17, 27, 37 for receiving a drive pin 3, again as shown in FIG. 3B. Although only one bore is shown in FIGS. 1A and 3A, it will be understood that two or more thereof may be provided if necessary.

FIG. 3B shows a portion of an armature winding 4 with the commutator lamellae 1 contacted by the carrier disc 31 of the third embodiment, as a matter of example; the same arrangement would apply to the discs 11 and 21. The disc 31 abuts a shoulder 2a on the shaft 2, as shown. The ends 4a of the winding 4 are electrically connected, such as for example by soldering or spot welding, with the angularly bent ends of the rivet-shaped pressure members 33 of this embodiment. Similar electrical contacts can be provided in case of the members 13 and 23.

It will be clear from the illustration of FIG. 3B that the lamellae or segments 1 of the collector ring are pressed against the carrier disc 31 so that the latter is accordingly deformed (compare its shape in FIGS. 3 and 3B).

Commutator lamellae 1 and carrier disc 11, 21, 31 are prevented from unwanted relative rotation by one or more drive pins 3; axial movement is prevented by the provision of a securing ring 5 which is lodged in an appropriate groove of the rotor shaft 2. It will be understood by those skilled in the art that other conventional means, e.g. a spline, can be used for these expedients. Insulation 6 is provided in a conventional manner between the lamellae 1.

It will be seen that the disc 11 shown in FIGS. 1 and 1A has one pressure member 13 on each segment 15, flanked by a pair of slits 14. This is the preferred arrangement when we have an uneven number, e.g. 11, of collector lamellae 1 and contacting pressure members 13.

In contradistinction, if the number of collector lamellae and pressure members is even, e.g. 16, as shown in FIG. 3A, the slits 34 in disc 31 are disposed after each second pressure member 33 so that each segment 35 carries two of these members, thereby providing a two-point contact area between each segment and the associated lamellae 1.

We claim:

1. Electric contacts between nonmetallic collector lamellae, such as made of carbon, and metallic armature windings of electric motors, comprising a thin, resilient, electrically nonconductive carrier disc adapted to be disposed on the rotor shaft of the motor between the lamellae and the armature, and a plurality of relatively rigid, electrically conductive pressure members secured to said disc in a substantially symmetrical, radial arrangement, the number of said members corresponding to that of said lamellae, for providing frictional contact between said members and the lamellae, and for fixed electrical connections between said pressure members and the respective ends of the motor windings.

2. The electric contacts as defined in claim 1, wherein said disc is made of a fiberglass-reinforced plastic material.

3. The electric contacts as defined in claim 1, wherein said disc is provided with at least one bore for receiving therein a drive pin and the like element associated with the motor, for preventing unwanted relative rotation therebetween.

4. The electric contacts as defined in claim 1, wherein said members are hook shaped.

5. The electric contacts as defined in claim 1, wherein said members are in the form of rivets.

6. The electric contacts as defined in claim 5, wherein said rivets have angularly bent shanks.

7. The electric contacts as defined in claim 1, wherein said disc is provided with circumferential cutouts for securing therein said members, with portions of the latter facing and contacting the lamellae when said disc is disposed on the shaft of the motor.

8. The electric contacts as defined in claim 1, wherein said disc is provided with substantially radial slits, thereby providing a number of individually resilient segments to which said members are secured.

9. The electric contacts as defined in claim 8, wherein said slits are provided between consecutive pairs of said members, the latter having an even number.

10. The electric contacts as defined in claim 8, wherein the inner ends of said slits are provided between consecutive ones of said members, the latter preferably having an uneven number.

11. The electric contacts as defined in claim 8, wherein the inner ends of said slits are limited by bore-shaped enlargements, for preventing breakage of said disc between said segments.

UNITED STATES PATENT OFFICE
CERTIFICATE OF CORRECTION

Patent No. 3,551,716      Dated December 29, 1970

Inventor(s) Knut Jensen et al.

It is certified that error appears in the above-identified patent and that said Letters Patent are hereby corrected as shown below:

In the heading, under [72],"Kari-Marx-Stadt" should read -- Karl-Marx-Stadt --. Column 4, lines 34 and 35, cancel "the inner ends of".

Signed and sealed this 16th day of March 1971.

(SEAL)
Attest:

EDWARD M. FLETCHER, JR.
Attesting Officer

WILLIAM E. SCHUYLER, JR
Commissioner of Patents